(12) United States Patent
Holder

(10) Patent No.: US 8,388,198 B2
(45) Date of Patent: Mar. 5, 2013

(54) DEVICE AND APPARATUS FOR EFFICIENT COLLECTION AND RE-DIRECTION OF EMITTED RADIATION

(75) Inventor: Ronald Garrison Holder, Laguna Niguel, CA (US)

(73) Assignee: Illumination Management Solutions, Inc., Irvine, CA (US)

( * ) Notice: Subject to any disclaimer, the term of this patent is extended or adjusted under 35 U.S.C. 154(b) by 346 days.

(21) Appl. No.: 12/873,884

(22) Filed: Sep. 1, 2010

(65) Prior Publication Data

US 2012/0051063 A1   Mar. 1, 2012

(51) Int. Cl.
*F21V 7/04* (2006.01)
(52) U.S. Cl. .................... 362/397; 362/311.02
(58) Field of Classification Search .................. 362/147, 362/297, 298, 299, 311.02, 346, 350
See application file for complete search history.

(56) References Cited

U.S. PATENT DOCUMENTS

| | | | |
|---|---|---|---|
| 2,254,961 A | 9/1941 | Harris |
| 2,394,992 A | 2/1946 | Franck |
| 2,908,197 A | 10/1959 | Wells et al. |
| 3,596,136 A | 7/1971 | Fischer |
| 3,647,148 A | 3/1972 | Wince |
| 3,927,290 A | 12/1975 | Denley |
| 4,345,308 A | 8/1982 | Mouyard et al. |
| 4,734,836 A | 3/1988 | Negishi |
| 4,860,177 A | 8/1989 | Simms |
| 4,907,044 A | 3/1990 | Schellhorn et al. |
| 4,941,072 A | 7/1990 | Yasumoto |
| 5,102,558 A | 4/1992 | McDougall |
| 5,636,057 A | 6/1997 | Dick et al. |
| 5,924,788 A | 7/1999 | Parkyn, Jr. |
| 5,939,996 A | 8/1999 | Kniveton et al. |
| 6,045,240 A | 4/2000 | Hochstein |
| 6,050,707 A | 4/2000 | Kondo et al. |
| 6,227,685 B1 | 5/2001 | McDermott |

(Continued)

FOREIGN PATENT DOCUMENTS

EP   1431653   6/2004
GB   718425   11/1954

(Continued)

OTHER PUBLICATIONS

Streetworks fixture from Cooper Lighting and 2 IES files, Aug. 14, 2001.

(Continued)

*Primary Examiner* — David V Bruce
(74) *Attorney, Agent, or Firm* — King & Spalding LLP

(57) ABSTRACT

An apparatus is described, including a light source, a lens and two reflectors. A first reflector is positioned to reflect a first portion of light from the light source, wherein the first portion of light is radiated from the light source in a central forward solid angle as defined by an outer edge of the first reflector. The lens is azimuthally horizontal to the light source for accepting a second portion of light from the light source emitted in a peripheral forward solid angle. A second reflector reflects the first portion of light after reflectance from the first reflector and the second portion of light after passing through the lens in a composite beam, wherein the first reflector and the lens are configured such that the first and second portions of light behave as though they were emitted from a point source at the second reflector focus.

31 Claims, 9 Drawing Sheets

U.S. PATENT DOCUMENTS

| | | |
|---|---|---|
| 6,273,596 B1 | 8/2001 | Parkyn, Jr. |
| 6,341,466 B1 | 1/2002 | Kehoe et al. |
| 6,345,800 B1 | 2/2002 | Herst et al. |
| 6,441,558 B1 | 8/2002 | Muthu et al. |
| 6,461,008 B1 | 10/2002 | Pederson |
| 6,502,956 B1 | 1/2003 | Wu |
| 6,536,923 B1 | 3/2003 | Merz |
| 6,560,038 B1 | 5/2003 | Parkyn et al. |
| 6,598,998 B2 | 7/2003 | West et al. |
| 6,639,733 B2 | 10/2003 | Minano |
| 6,784,357 B1 | 8/2004 | Wang |
| 6,785,053 B2 | 8/2004 | Savage, Jr. |
| 6,837,605 B2 | 1/2005 | Reill |
| 6,850,001 B2 | 2/2005 | Takekuma |
| 6,895,334 B2 | 5/2005 | Yabe |
| 6,942,361 B1 | 9/2005 | Kishimura et al. |
| 6,948,838 B2 | 9/2005 | Kunstler |
| 6,965,715 B2 | 11/2005 | Lei |
| 6,986,593 B2 | 1/2006 | Rhoads et al. .............. 362/308 |
| 6,997,580 B2 | 2/2006 | Wong |
| 7,001,047 B2 | 2/2006 | Holder et al. ............ 362/249.04 |
| 7,070,310 B2 | 7/2006 | Pond et al. |
| 7,073,931 B2 | 7/2006 | Ishida |
| 7,102,172 B2 | 9/2006 | Lynch et al. |
| 7,104,672 B2 | 9/2006 | Zhang |
| 7,153,015 B2 | 12/2006 | Brukilacchio |
| 7,172,319 B2 | 2/2007 | Holder |
| 7,181,378 B2 | 2/2007 | Benitez et al. .................. 703/2 |
| 7,204,627 B2 | 4/2007 | Hishida |
| 7,278,761 B2 | 10/2007 | Kuan |
| 7,281,820 B2 | 10/2007 | Bayat et al. |
| 7,322,718 B2 | 1/2008 | Setomoto et al. |
| D563,036 S | 2/2008 | Miyairi et al. |
| 7,339,200 B2 | 3/2008 | Amano et al. |
| 7,348,723 B2 | 3/2008 | Yamaguchi et al. |
| 7,352,011 B2 | 4/2008 | Smits et al. |
| 7,410,275 B2 | 8/2008 | Sommers et al. |
| D577,852 S | 9/2008 | Miyairi et al. |
| 7,460,985 B2 | 12/2008 | Benitez |
| 7,461,948 B2 | 12/2008 | Van Voorst Vader et al. |
| 7,507,001 B2 | 3/2009 | Kit |
| 7,572,654 B2 | 8/2009 | Chang |
| 7,618,162 B1 | 11/2009 | Parkyn et al. |
| 7,625,102 B2 | 12/2009 | Koike et al. |
| 7,674,018 B2 | 3/2010 | Holder et al. |
| 7,775,679 B2 | 8/2010 | Thrailkill et al. |
| 7,809,237 B2 | 10/2010 | Pozdnyakov et al. |
| 7,942,559 B2 | 5/2011 | Holder |
| 7,972,035 B2 | 7/2011 | Boyer |
| 7,972,036 B1 | 7/2011 | Schach et al. |
| 7,993,036 B2 | 8/2011 | Holder et al. |
| 8,007,140 B2 | 8/2011 | Zhang et al. |
| 2002/0034081 A1 | 3/2002 | Serizawa |
| 2003/0067787 A1 | 4/2003 | Serizawa |
| 2003/0081425 A1* | 5/2003 | Kumar et al. ................. 362/518 |
| 2003/0099115 A1 | 5/2003 | Reill |
| 2004/0037076 A1 | 2/2004 | Katoh et al. |
| 2004/0070855 A1 | 4/2004 | Benitez et al. |
| 2004/0105171 A1 | 6/2004 | Minano et al. |
| 2004/0105261 A1 | 6/2004 | Ducharme |
| 2004/0105264 A1 | 6/2004 | Spero |
| 2004/0189933 A1 | 9/2004 | Sun et al. |
| 2004/0207999 A1 | 10/2004 | Suehiro |
| 2004/0218388 A1 | 11/2004 | Suzuki |
| 2004/0222947 A1 | 11/2004 | Newton et al. |
| 2004/0228127 A1 | 11/2004 | Squicciarini |
| 2005/0073849 A1 | 4/2005 | Rhoads et al. |
| 2005/0207165 A1 | 9/2005 | Shimizu et al. |
| 2006/0034082 A1 | 2/2006 | Park |
| 2006/0039143 A1 | 2/2006 | Katoh |
| 2006/0081863 A1 | 4/2006 | Kim et al. |
| 2006/0083003 A1 | 4/2006 | Kim et al. |
| 2006/0138437 A1 | 6/2006 | Huang et al. |
| 2006/0238884 A1 | 10/2006 | Jang |
| 2006/0245083 A1 | 11/2006 | Chou et al. |
| 2006/0250803 A1 | 11/2006 | Chen |
| 2006/0255353 A1 | 11/2006 | Taskar |
| 2006/0285311 A1 | 12/2006 | Chang et al. |
| 2007/0019416 A1 | 1/2007 | Han |
| 2007/0058369 A1 | 3/2007 | Parkyn et al. |
| 2007/0063210 A1 | 3/2007 | Chiu |
| 2007/0066310 A1 | 3/2007 | Haar |
| 2007/0076414 A1 | 4/2007 | Holder |
| 2007/0081340 A1 | 4/2007 | Chung et al. |
| 2007/0091615 A1 | 4/2007 | Hsieh et al. |
| 2007/0183736 A1 | 8/2007 | Pozdnyakov |
| 2007/0201225 A1 | 8/2007 | Holder |
| 2008/0013322 A1 | 1/2008 | Ohkawa |
| 2008/0025044 A1 | 1/2008 | Park et al. |
| 2008/0100773 A1 | 5/2008 | Hwang |
| 2008/0174996 A1 | 7/2008 | Lu |
| 2008/0239722 A1 | 10/2008 | Wilcox |
| 2008/0273327 A1 | 11/2008 | Wilcox et al. |
| 2010/0014290 A1 | 1/2010 | Wilcox |
| 2010/0039822 A1 | 2/2010 | Bailey ..................... 362/296.1 |

FOREIGN PATENT DOCUMENTS

| | | |
|---|---|---|
| GB | 794670 | 5/1958 |
| GB | 815609 | 7/1959 |
| JP | 06-177424 | 6/1994 |
| JP | 11/154766 | 9/1997 |
| JP | 2005-062461 | 3/2005 |
| KR | 10-2006-0033572 | 4/2006 |
| KR | 10-2006-0071033 | 6/2006 |
| WO | WO 9624802 | 8/1996 |
| WO | WO 98/33007 | 7/1998 |
| WO | WO 03044870 | 5/2003 |
| WO | WO 2005/041254 | 5/2005 |
| WO | WO 2005/057082 | 6/2005 |
| WO | WO 2005/093316 | 10/2005 |
| WO | WO 2007/100837 | 9/2007 |
| WO | WO 2008/144672 | 11/2008 |
| WO | WO 2010/019810 | 2/2010 |

OTHER PUBLICATIONS

Bisberg, *LED Magazine*, The 5mm. Package Versus the Power LED: Not a Light choice for the Luminaire Designer, pp. 19-21, Dec. 2005.
*LED Magazine*, p. 36 Oct. 2005.
ISR and Written Opinion of ISA, PCT/US07/05118 mailed Mar. 11, 2008.
Bortz, "Optimal Design of a Non imaging Projection Lens for Use with an LED Light Source and a Rectangular Sheet." SPIE, pp. 130-138, vol. 4092, USA, published 2000.
International Search Report for PCT/US08/64168 mailed on Aug. 15, 2008.
Extended Search Report for EP Application No. 11006191 mailed Nov. 7, 2011.
Extended Search Report for EP Application No. 11006189 mailed Nov. 7, 2011.
Extended Search Report for EP Application No. 1100611006190 mailed Nov. 7, 2011.
Timinger, Dr. Andreas, *High Performance Optics Design for LEDs*, Strategies in Light, Feb. 2005.
Ries, Harold & Julius Muschaweck, *TailoredFreeform Optical Surfaces*, Optical Society of America, vol. 19, No. 3, Mar. 2002.
Jolley L.B.W. et al., The Theory and Design of Illuminating Engineering Equipment, 1931.
Representative Cooper Lighting HID Dropdown Roadway Luminaire and Associated IES Diagram Files.
International Search Report for PCT/US11/049388 mailed on Apr. 9, 2012.
Order; Case No. 11-CV-34-JPS; United States District Court Eastern District of Wisconsin; Jun. 8, 2012; (referencing U.S. Patent Nos. 7,674,018 and 7,993,036).

* cited by examiner

DEVICE AND APPARATUS FOR EFFICIENT COLLECTION AND RE-DIRECTION OF EMITTED RADIATION

BACKGROUND OF THE INVENTION

1. Field of the Invention

The invention relates the field of light sources using light emitting diodes (LEDs) and in particular to an apparatus and a method of collecting the energy radiating from them. The device could be used in general lighting, decorative and architectural lighting, portable lighting, emergency lighting and many other applications. The invention is particularly useful when direct visibility to the intense light source is undesirable, such as is the case for a dentist's patient.

2. Description of the Prior Art

Most high brightness LED optical solutions exhibit a very annoying bright LED source, such that viewers in close proximity will be discomforted at best and distracted or even temporarily 'blinded' when they 'look back' at the apparatus. Several optical solutions place the LED behind a forward mounted reflector that reflects outward a portion of the forward solid angle light emitted by the LED and reflects it again substantially along the centerline into the original direction of the LED. The peripheral forward light from the LED, however is largely ignored or is directed out of the optic peripherally, not along the centerline. By empirical measurements the beam efficiency of this system and similar solutions can be less than 50%.

Another means seen in the prior art is the reflex reflector such as that taught in U.S. Pat. No. 7,001,047. This solution, while showing better efficiency is typically less than 70% beam efficient, depending on system aperture.

What is needed is an optic solution whereby efficient collection of almost all of an LED's radiated energy can be obtained and projected into an indirect beam with an illumination distribution that is useful.

SUMMARY OF THE INVENTION

The invention is defined as an apparatus comprising an LED light source, a reflector positioned to reflect light from the LED light source which is radiated from the LED light source in a forward solid angle as defined by the reflector, and a lens disposed azimuthally horizontal accepting the peripheral forward solid angle of light from the source of the LED, the two objects reflector and lens focusing light into a predetermined radial pattern which is then intercepted and redirected along the centerline of the optic and LED by reflection into a composite beam, so that the apparatus projects a beam of light comprised of the light radiated in the central forward solid angle and peripheral forward solid angles.

The central forward solid angle and the peripheral forward solid angle are demarcated from each other at approximately 45 degrees from the optical axis of the light source. The light source comprises an LED emitter and a package in which the LED emitter is disposed. The package comprises a package lens for minimizing refraction of light radiated from the LED emitter by the package. The lens is disposed around the package lens. In one embodiment the reflector is suspended in front of the package lens by means of a leg or legs or a bezel.

The lens directs light radiated by the LED source into the peripheral forward solid angle and likewise the reflector directs light radiated by the LED source into the peripheral forward solid angle. The secondary reflector then redirects the two beams into one composite beam. In one embodiment of the invention the two separately formed beams will appear as if they were one. The designer has control over the individual beams, however, and may tailor the beam output individually or together to generate the desired result. In another preferred embodiment the beam or beams would be variable and the adjustment of one or both would provide a desired beam effect such as zoom or magnification.

In another preferred embodiment the lens and reflector have a common point of focus that is not the center of illumination of the LED. This virtual focus point is then the focus point of a parabolic reflector section that is the secondary reflector. Many variations of this concept could include the secondary reflector focus being one of the foci of an elliptical reflector surface.

In the illustrated embodiment the lens is arranged and configured relative to the LED light source so that the peripheral forward solid angle extends to a solid angle of approximately 45 to 90 degrees centered on the optical axis. The reflector is arranged and configured relative to the LED light source so that the forward solid angle extends to a solid angle of approximately 0 to 45 degrees centered on the optical axis.

The invention is also defined as a method comprising the steps of radiating light from an LED light source, reflecting light into a first predetermined beam portion, which light is radiated from the LED light source in a forward solid angle, and focusing light into a second predetermined beam portion, which light is radiated from the LED light source in a peripheral forward solid angle. The central forward solid angle and the peripheral forward solid angle are demarcated from each other at approximately 45 degrees solid angle centered on the optical axis.

In a preferred embodiment of the invention since all the light from the LED is distributed into the two beams and the two beams form a composite beam treated by the secondary reflector, the secondary reflector can focus the composite beam into a beam that comprises all of the LED light that is not lost in the system to reflection and/or refraction losses and the system can deliver a very high (approximately 80%) beam efficiency of indirect light.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 5 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of a preferred embodiment which is presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
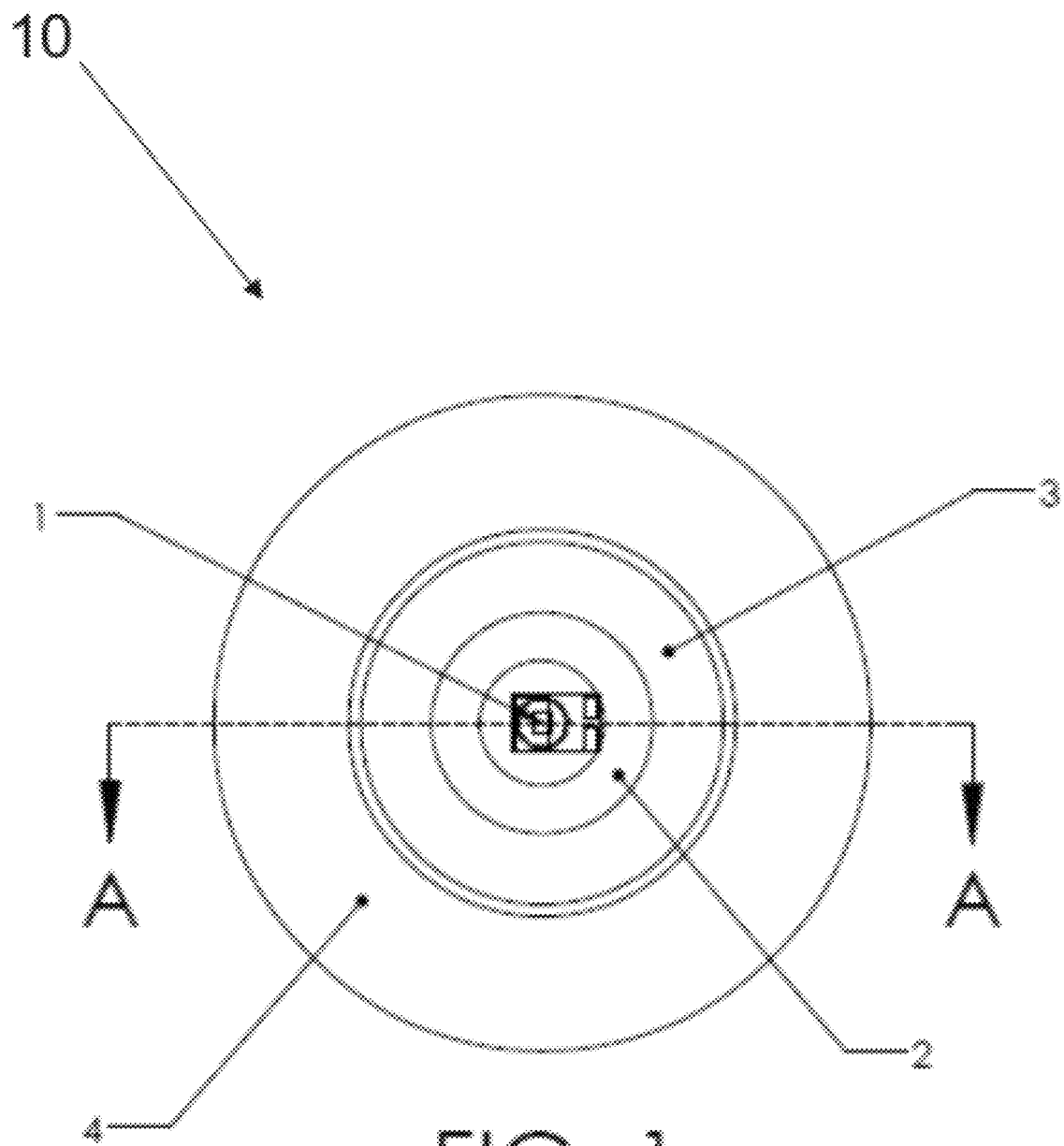
FIG. 1 is a top view of an embodiment described herein.
Figure 2A:
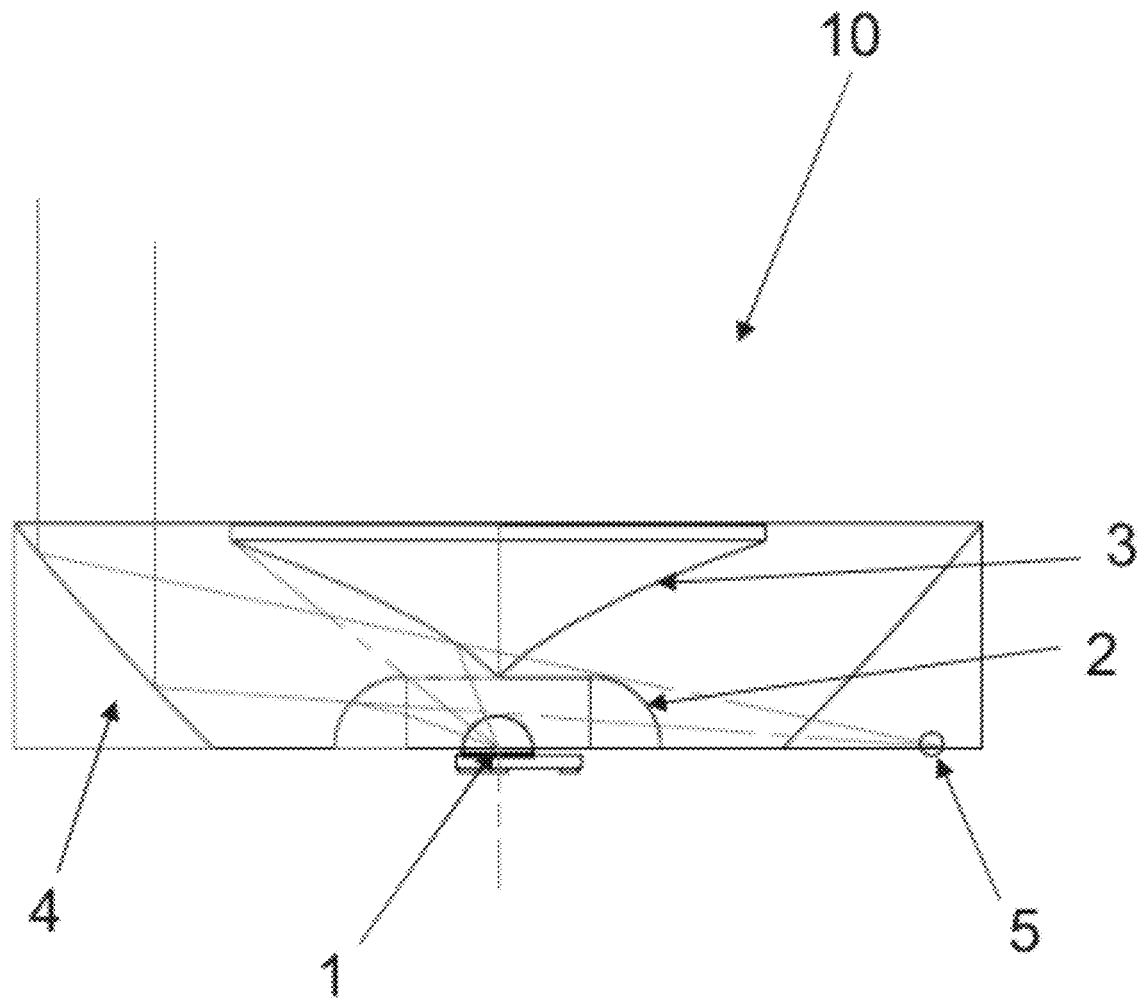
FIGS. 2a-2c are side cross-sectional views of the embodiment of FIG. 1.
Figure 2B:
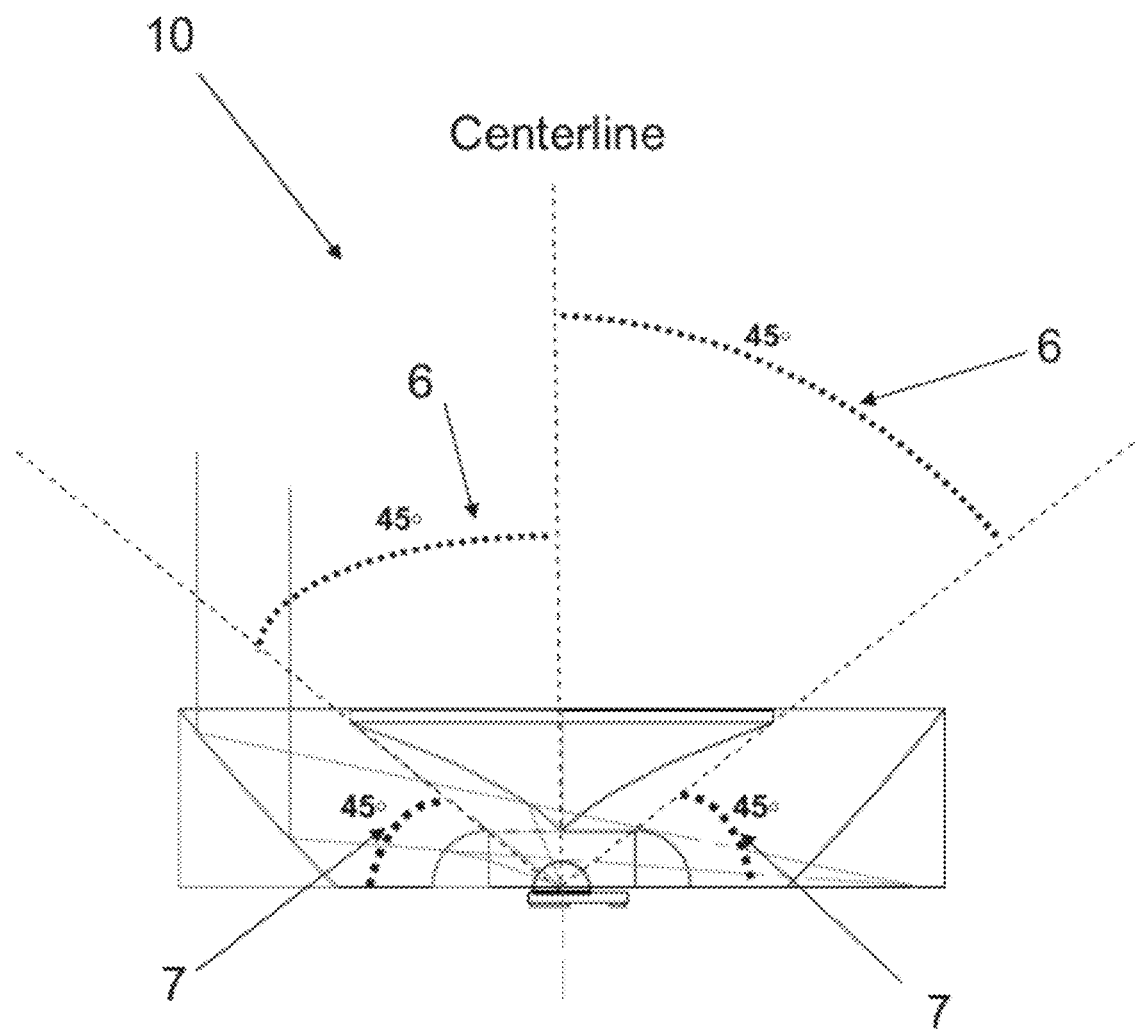
Figure 2C:
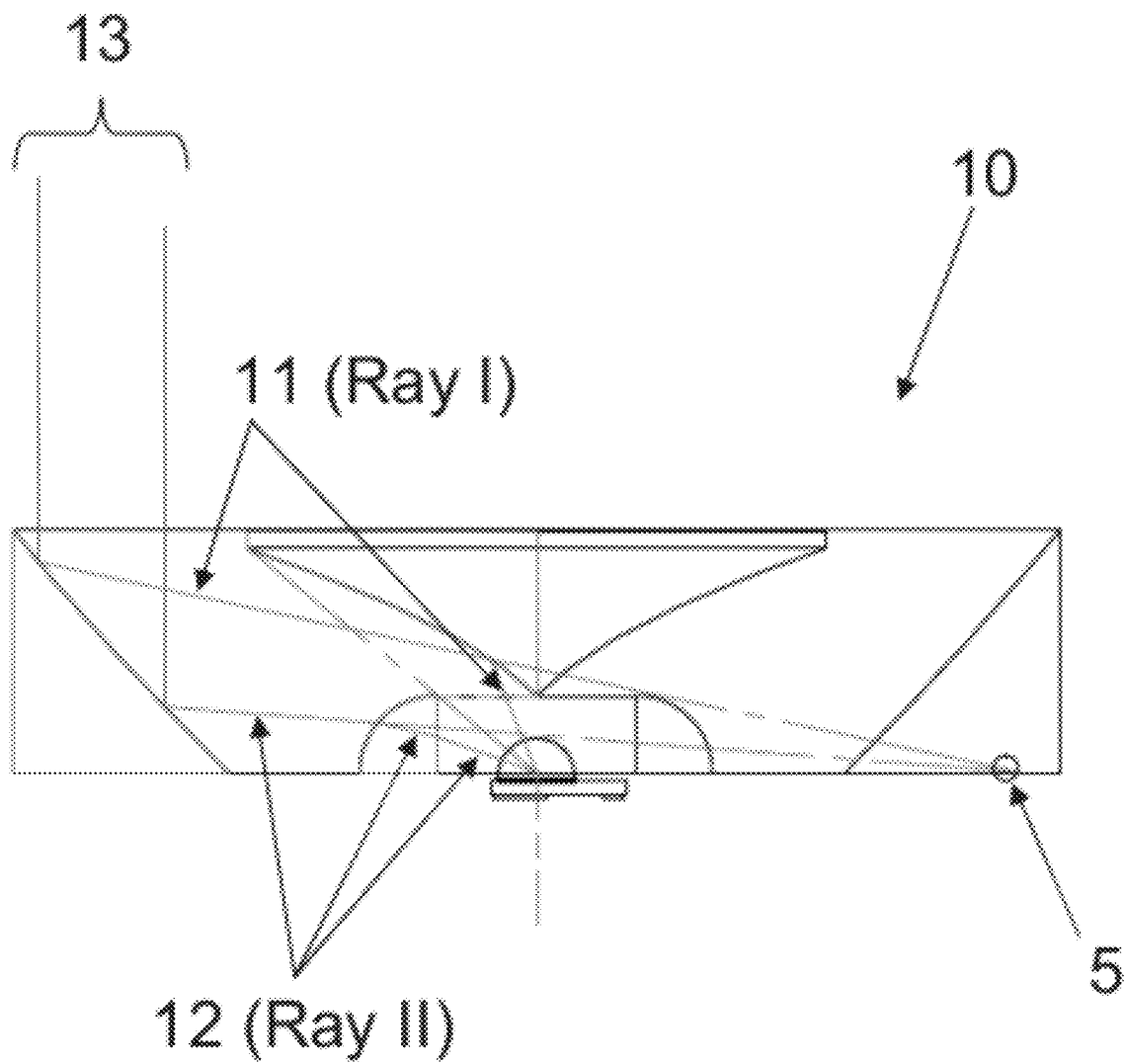
Figure 3:
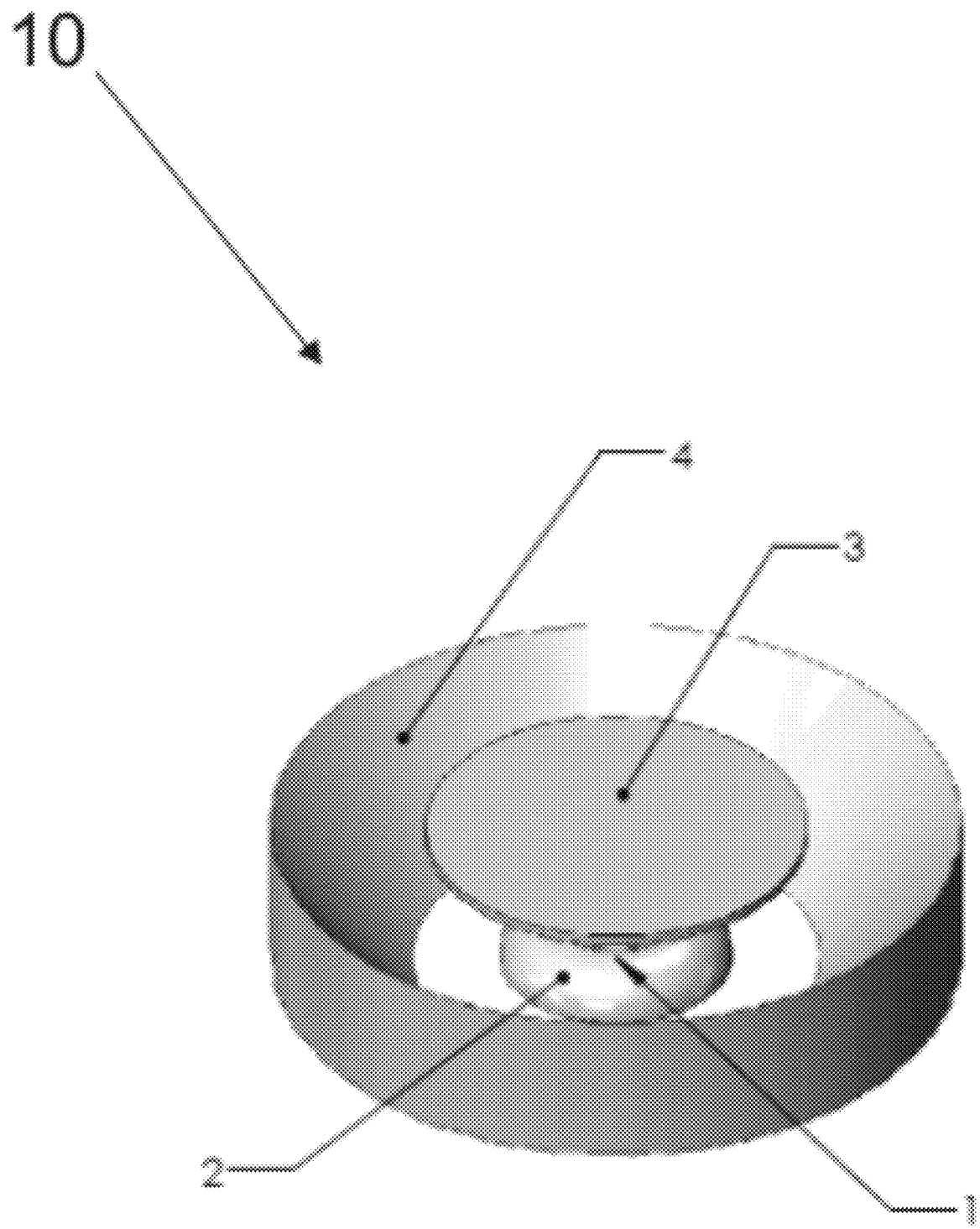
FIG. 3 is an isometric view of the embodiment shown in FIGS. 1 and 2.

In FIGS. 1 through 3 illustrate an exemplary device 10 in accordance with the invention. LED source 1 is shown as packaged in a conventional package, which is generally comprised of a substrate in which the light emitting junction is encapsulated in a transparent epoxy or plastic housing formed to provide a hemispherical front dome or lens over the light emitting junction or chip. Many different types and shapes of packages could be employed by an LED manufacturer and all types and shapes are included within the scope of the invention. Hereinafter in the specification the term, "LED source 1."

FIG. 1 shows a preferred embodiment of the invention in which a first reflector 3 is suspended over an LED source 1. The surface of the first reflector 3 may be specially treated or prepared to provide a highly specular or reflective surface for the particular wavelengths of light emitted by LED source 1. In the embodiment presented, the shape of the first reflector 3 is concave. This process of surface treatment to maximize reflectance of select wavelengths is known to those skilled in the art and will not be detailed herein. In the illustrated embodiment a refractor or lens 2 (hereafter "lens 2") is shown in FIGS. 1 through 3 as having a toroidal, donut-like shape as shown, but is not limited as such. The shape of lens 2 is determined such that it operates on the azimuthal forward angle light from the LED and processes this light to create a narrow beam with pinpoint-like cross-section as viewed and processed by a second reflector 4. The first reflector 3 may include or be connected to an exterior housing (not shown), which provides support and connection to the apparatus (not shown) in which the device may be mounted. The first reflector 3 could also be suspended or attached or be a part of a planar or non-planar cover lens that projects over the entire optical system. LED source 1 is disposed in the center of second reflector 4 by any means such as a heat sink or a printed circuit board ("PCB") (not shown). The first reflector 3 could be suspended over the LED source 1 by means of spider not shown or as part of a bezel or in any other manner (not shown) so as to interfere as little as possible with the light exiting the optical system.

As shown in FIGS. 2a - 2c showing cross-section A-A from FIG. 1, the LED source 1 is positioned substantially at the center of the circle formed by the outer circumference of the first reflector 3, the LED source 1 emitting in the direction of the reflective surface of the first reflector 3. The first reflector 3 collects essentially all the light emitted from the LED source 1 that is radiating into a region between about the forward 45 degree solid angle 6 (referred to as the center solid angle) on the centerline or optical axis of the LED source 1 and illustrated in FIG. 2c by the lines referenced at 11 (Ray I).

The rays of light emitted from the LED source 1 that are contained within the angles of about 45 degrees and 90 degrees (peripheral forward solid angle) 7 as illustrated will be collected by the lens 2 and controlled by the optical properties of lens 2 as illustrated in FIG. 2c by the lines referenced at 12 (Ray II). It should be clear to those skilled in the art that within FIGS. 2a-2c, only half of the ray paths and configurations are illustrated; a mirror image could be illustrated on the adjacent half of the figures, but has been intentionally removed in order to simplify the illustration. Indeed it should also be clear that the illustrated rays are duplicated in a complete 360 degree path in accordance with the light emitted from the LED source. Additionally, it should be apparent to those skilled in the art that there will necessarily be some overlap at the point where the optical edges of the first reflector 3 and the lens 2 meet. It is also contemplated that the embodiments are not limited to an approximate 50/50 split of the light, e.g., 0 to 45 degrees and 45 to 90 degrees. Instead, the emitted light may be bifurcated into non-equal parts, so long as the light is processed by first reflector 3 and lens 2 to create a narrow beam with pinpoint-like cross-section as viewed and processed by a second reflector 4. The second reflector 4 combines beams 11 and 12 into composite beam 13.

Further to FIGS. 2a - 2c, reference numeral 5 illustrates annular locus of virtual foci that both the first reflector 3 and the lens 2 create by their shape. In a preferred embodiment, the location referenced at 5 is the actual focus of the second reflector 4. Therefore all the rays emanating from the first two optical elements 2, 3 can be considered by the second reflector 4 to have a common source. This narrow angle ray set with a single point of focus in cross-section allows the designer freedom to create a tightly focused, efficient beam utilizing essentially all the light available from the LED source 1, minus surface losses (discussed below).

Figure 4A:
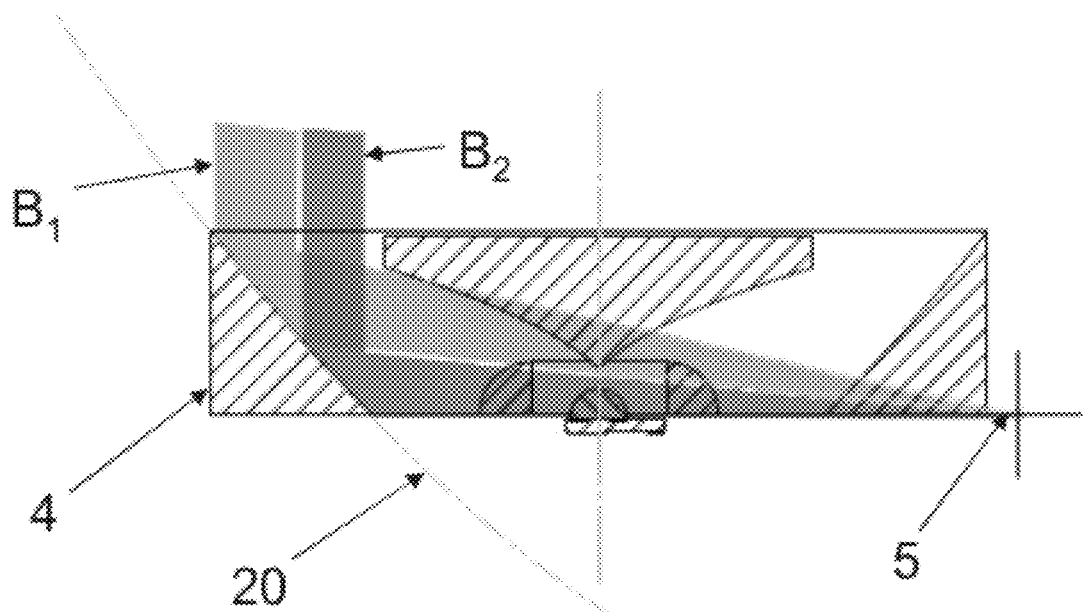
FIGS. 4a-4c illustrate how the refractor/first reflector combination of an embodiment operates on emitted light such that the beams that impinge upon the second reflector appear to be emitted from a point source at the focus of the second reflector, a virtual source.
Figure 4B:
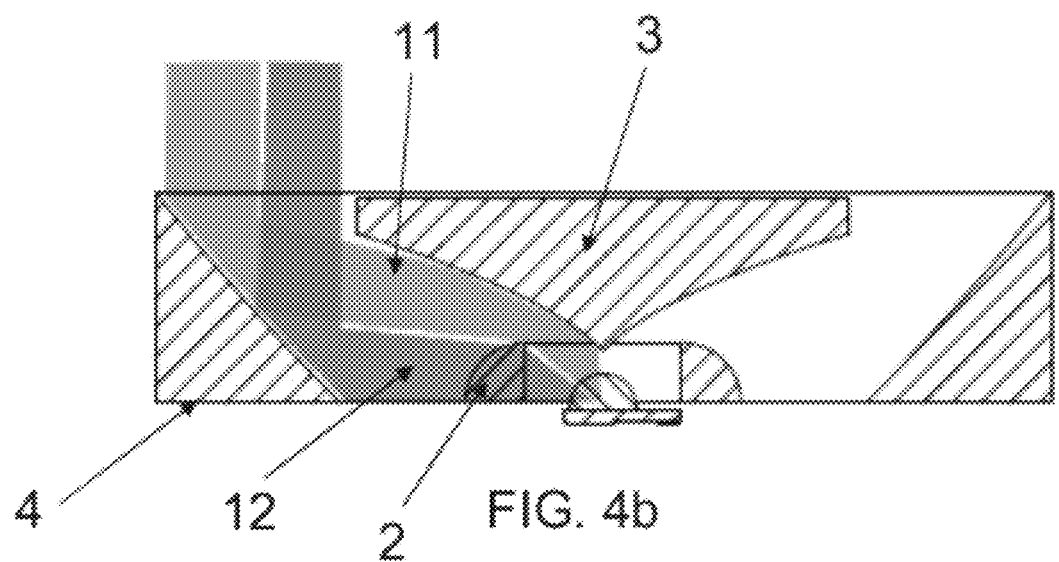
Figure 4C:
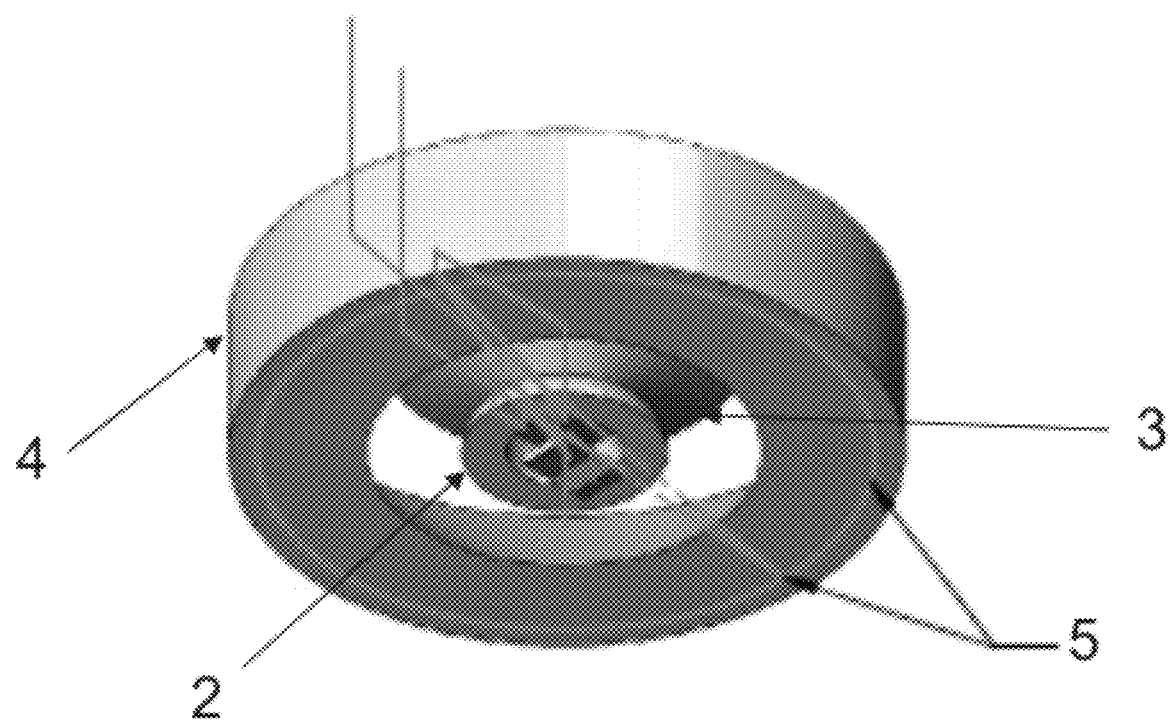
Figure 5:
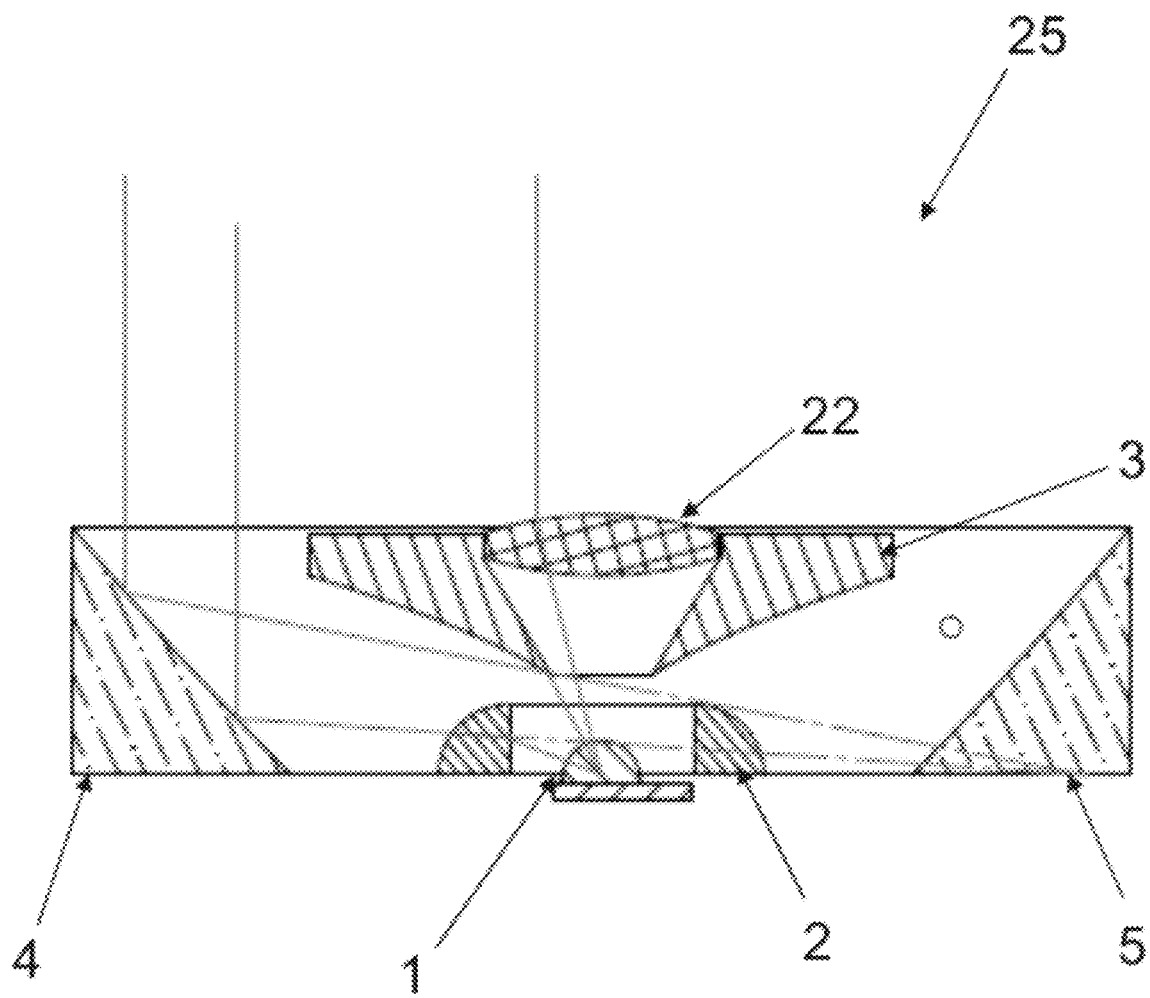
FIG. 5 illustrates an alternative embodiment described below, having an additional refractor located in the path of the optical axis of the source.

FIGS. 4a - 4c illustrate an embodiment wherein the first reflector 3 and the lens 2 are formed so as to create beams that are viewed as though they are generated from a point source at the focus of the second reflector 4. Referring to FIG. 4a, the second reflector 4 has a parabolic cross-section (illustrated by curved broken line 20), for instance, but is not a common parabolic reflector since the surface of revolution has a different centerline than the focus (5) of its cross-section. Hypothetical beams $B_1$ and $B_2$ are derived from focus 5 and FIG. 4a indicates how second reflector 4 operates thereon.

Now, referring to FIG. 4b, it is illustrated how the configuration of first reflector 3 and lens 2 essentially create beams (11, 12) that share a common focus ray set and thus appear to second reflector 4 as though they are coming from focus or virtual source 5 just as hypothetical beams $B_1$ and $B_2$. Accordingly, manipulation of the beams (11, 12) will be very effective and efficient. Said another way, if beams (11, 12) were not sharing a common, or near common, focus, any downstream optical system, such as the secondary reflector 4, would 'see' a larger source or multiple sources which is known to be less efficient and less effective than a small singular point source. The location of the virtual source created by the optical configuration can be varied to some extent and still produce beams that appear as though they derived from a common point source. The virtual focus or source 5 can be described as an annular focus as shown in FIG. 4c.

FIG. 3 is a perspective view of the embodiment of the invention shown in FIGS. 1 and 2. The LED source 1, a radial lens 2, and concave reflector 3 are positioned within second reflector 4 as shown in the side cross-sectional view of FIG. 2.

The invention provides almost complete or 100% collection efficiency of the light energy radiated from an LED source 1 for purposes of illumination, and distribution of the collected energy into a controlled and definable beam pattern. Be reminded that an LED is a light emitting region mounted on the surface of a chip or substrate. Light from the radiating junction is primarily forward directed out of the surface of the chip with a very small amount directed to the sides and slightly below the substrate's horizon. Light radiating from the junction into the substrate is partially reflected, refracted and absorbed as heat. The invention collects substantially all the light, or energy radiated from an LED source 1 which is not absorbed in the substrate on or in which it sits and redirects it into two distinct beams of light as described below. By design, these beams could be aimed primarily into a single direction, but need not be where in an application a different distribution of the beams is desired.

The invention collects all of the LED energy in the two regions or beams (11, 12), wherein a first region 6 is defined by the center solid angle and the second region is defined by the peripheral solid angle 7 as described above. The exact angular dividing line between the two beams can be varied according to the application at hand. Accordingly, while the regions essentially include equal angle covered as exemplified herein, this need not necessarily be the case in all embodiments. The invention thus controls substantially all of the energy radiating from the LED source 1 with only surface and small figure losses. Figure losses include light loss due to imperfections in some aspect of the optical system arising from the fact that seams, edges, fillets and other mechanical disruptions in the light paths are not perfectly defined with mathematical sharpness, but are made from three-dimensional material objects having microscopic roughness or physical tolerances of the order of a wavelength or greater.

In the exemplary embodiment of FIGS. 1, 2, 3 and 4*b* as shown and described the energy in the first region is reflected via first reflector 3 that is suspended over the LED 1. The energy in the second region is collected via a lens 2. A slight overlap in collection angles can insure no energy from the LED 1 is leaked between the two regions due to the LED emitter being larger than a point source. The resultant beam can be designed to match system requirements by altering either or both of the primary elements, the lens 2 or the first reflector 3 or the second reflector 4. The invention allows for any of these surfaces to be modified to control the resultant beam as would be understood by one skilled in the art.

The first and second reflectors 3 and/or 4 may be designed to provide a collimated, convergent or divergent beam in accordance with design preferences. The first reflector 3 may be a common conic or not and may be faceted, dimpled or otherwise modified to provide a desired beam pattern. The device 10 may optionally have at least one additional lens and/or surface(s) formed as part of the system that further controls or modify the light radiating from the first and second reflectors 3 and 4 and lens 2.

Thus, it can now be understood that the optical design of lens 2 including its longitudinal positioning relative to LED 1 can be changed according to the teachings of the invention to obtain the objectives of the invention. For example, the nature of the illumination in the central solid angle of the two-part beam can be manipulated by the optical design of lens 2 and first and second reflectors 3 and 4, e.g. the degree of collimation. Further, the dividing line and transition between the two parts of the beam, namely the central and peripheral solid angles of the beam, can be manipulated by the longitudinal positioning and radial size or extent of lens 2 relative to LED 1.

In a variation to the optical configuration of FIGS. 1-3 and 4*b*, FIG. 5 illustrates an embodiment wherein the optical configuration 25 facilitates a subset of the emitted light that would have been reflected from first reflector 3, i.e., a portion of the central forward angle light, being directed through a second refractor 22 instead of the first reflector 3. In this embodiment, the light emitted from the LED is trifurcated. The lens 2 still operates on the light in the azimuthal angle, but the remaining light is now split between the first reflector 3 and the second lens 22.

Figure 6:
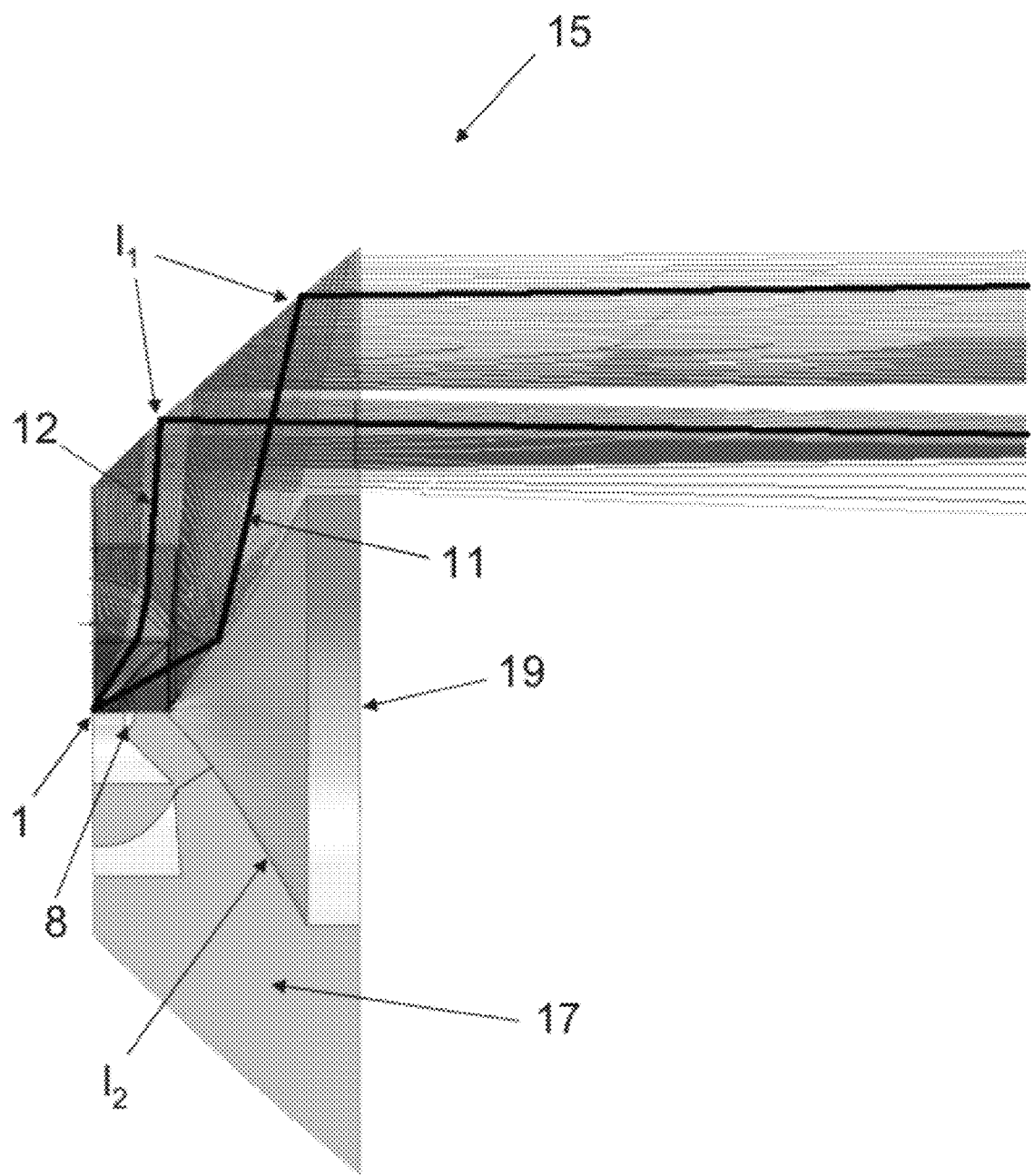
FIG. 6 is an alternative embodiment of the invention utilizing components that achieve desired results based on the concept of total internal reflection.

In an alternative embodiment, the LED light distribution result achieved with the configuration shown in FIGS. 1 through 3 and 4*b* can also be achieved using a device that operates partially (or fully) on the concept of total internal reflection. More specifically, a molded device could include different material interfaces and/or embedded lenses to achieve the light distribution described above. Referring to FIG. 6, LED source 1 (including encapsulating lens 8) is attached to a pre-formed optical device 15 that includes embedded lens 2, which is formed in a second material 17 that does not affect the light path, but that results in total internal reflection of the light passing therethrough at the interface $I_1$ of the second material 17 and air. The second material 17 and embedded lens 2 forming a first part of the overall molded device and being formed so as to receive a second component 19 therein. This second component 19 could be a reflector or a material that causes total internal reflection at the interface $I_2$ thereof with the second material 17. As discussed in detail above, a first portion of the light emitted from the LED source 1 (represented by ray 11) is reflected by second part 19 and is redirected via total internal reflection at the intersection $I_1$. A second portion of the light emitted from the LED source 1 (represented by ray 12) is directed by lens 2 and in this embodiment, passes through second material 17 and is redirected via total internal reflection at the interaction $I_1$.

Multiple numbers of devices 10 may be arrayed to provide additional functionality. These arrays could include two or more instances of the invention that may be individually optimized by having a unique configuration of lens 2 and first and second reflectors 3 and 4. For example, an array of devices described above could be used to provide more light than a single cell or unit. The various light sources according to the invention in such an array could be pointed in selected directions, which vary according to design for each element depending on the lighting application at hand. The elements may each have a different focus or beam pattern, or may comprise at least more than one class of elements having a different focus or beam pattern for each class. For example, the invention when used in a wall illumination luminaire may be designed in an array to have a broadly spread beam directly under the lamp array, and a closer or more specifically focused spot or ring sending light out to the peripheral edges of the illumination pattern.

Many alterations and modifications may be made by those having ordinary skill in the art without departing from the spirit and scope of the invention. The potential range of applications includes, but is not limited to, dental lights, street lights, parking lights, head torches, bike lights, portable lights (e.g., flashlights), medical head lights, automotive headlights or taillights, motorcycles, aircraft lighting, marine applications both surface and submarine, and any other application where an LED light source might be desired.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. An apparatus comprising:
    a light source;
    a first reflector positioned to reflect a first portion of light from the light source, wherein the first portion of light is radiated from the light source in a central forward solid angle as defined by an outer edge of the first reflector;
    a lens disposed azimuthally horizontal to the light source for accepting a second portion of light from the light source emitted in a peripheral forward solid angle;
    a second reflector for reflecting the first portion of light after reflectance from the first reflector and the second portion of light after passing through the lens in a composite beam, wherein the first reflector and the lens are configured such that the first and second portions of light behave as though they were emitted from a point source at the focus of the second reflector.

2. The apparatus according to claim 1, wherein the composite beam exits the second reflector in a direction that is approximately parallel to an optical axis of the light source.

3. The apparatus according to claim 1, wherein the first portion of the light and the second portion of the light are demarcated from each other at approximately 45 degrees from the optical axis of the light source.

4. The apparatus according to claim 1, wherein the light source is a light emitting diode (LED).

5. The apparatus according to claim 1, wherein the first reflector is disposed facing the light source.

6. The apparatus according to claim 1, further comprising a housing to include the light source, first reflector, lens and second reflector, wherein the first reflector is connected to the housing via at least one leg or a bezel.

7. The apparatus according to claim 1, wherein the first reflector is a conical reflector.

8. The apparatus according to claim 1, wherein the second reflector is a parabolic reflector.

9. The apparatus according to claim 1, wherein each of the center and peripheral forward solid angles are approximately 45 degrees.

10. The apparatus according to claim 1, wherein the lens has a toroidal shape.

11. A method for controlling light from a light source comprising:
    emitting light from the light source over an approximately hemispherical area;
    reflecting by a first reflector a first portion of the emitted light in a first section of the hemispherical area;
    accepting at a lens a second portion of light from the light source emitted in a remaining section of the hemispherical area; and
    reflecting by a second reflector the first portion of light after reflectance from the first reflector and the second portion of light after passing through the lens in a composite beam, wherein the first reflector and the lens are configured such that the first and second portions of light behave as though they were emitted from a point source at the focus of the second reflector.

12. The method according to claim 11 further comprising blocking the light source from direct view by an observer in the path of the composite beam.

13. An apparatus comprising:
    a light source;
    a first interface positioned to cause reflection of a first portion of light from the light source, wherein the first portion of light is radiated from the light source in a central forward solid angle as defined by an outer edge of the first reflector;
    a lens disposed azimuthally horizontal to the light source for accepting a second portion of light from the light source emitted in a peripheral forward solid angle, wherein the lens is embedded within a first material;
    a second interface formed at the intersection of the first material and air and positioned to cause reflection by total internal reflection of the first portion of light after reflectance from the first interface and the second portion of light after passing through the lens in a composite beam, wherein the first interface and the lens are configured such that the first and second portions of light behave as though they were emitted from a point source at the focus of the second interface.

14. The apparatus in accordance with claim 13, wherein the composite beam exits the second interface in a direction approximately parallel to an optical axis of the light source.

15. The apparatus according to claim 13, wherein the first portion of light and the second portion of light are demarcated from each other at approximately 45 degrees from the optical axis of the light source.

16. The apparatus according to claim 13, wherein the light source is a light emitting diode (LED).

17. The apparatus according to claim 13, wherein the first interface is formed at the intersection of the first material and a second material and positioned to cause reflection by total internal reflection.

18. The apparatus according to claim 13, further comprising a housing to include the light source, first interface, lens and second interface.

19. The apparatus according to claim 13, wherein the first interface is conically shaped.

20. The apparatus according to claim 13, wherein the second interface is parabolically shaped.

21. The apparatus according to claim 13, wherein each of the center and peripheral forward solid angles are approximately 45 degrees.

22. The apparatus according to claim 13, wherein the lens has a toroidal shape.

23. An apparatus comprising:
   a light source;
   a first lens positioned to accept a first portion of light from the light source, wherein the first portion of light is radiated approximately along the optical axis of the light source;
   a first reflector positioned to reflect a second portion of light from the light source, wherein the second portion of light is radiated from the light source in an approximately central forward solid angle as defined by an outer edge of the first reflector and an outer edge of the first lens;
   a second lens disposed azimuthally horizontal to the light source for accepting a third portion of light from the light source emitted in a peripheral forward solid angle;
   a second reflector for reflecting the first portion of light after reflectance from the first reflector and the second portion of light after passing through the lens in a composite beam, wherein the first reflector and the first lens are configured such that the first and second portions of light behave as though they were emitted from a point source at the focus of the second reflector.

24. The apparatus according to claim 23, wherein the composite beam exits the second reflector in a direction that is approximately parallel to an optical axis of the light source.

25. The apparatus according to claim 23, wherein the first portion of light and the second portion of light are demarcated from each other at approximately 45 degrees from the optical axis of the light source.

26. The apparatus according to claim 23, wherein the light source is a light emitting diode (LED).

27. The apparatus according to claim 23, wherein the first reflector is disposed facing the light source.

28. The apparatus according to claim 23, further comprising a housing to include the light source, first lens, first reflector, second lens and second reflector, wherein the first reflector is connected to the housing via at least one leg or a bezel.

29. The apparatus according to claim 23, wherein the first reflector is a conical reflector.

30. The apparatus according to claim 23, wherein the second reflector is a parabolic reflector.

31. The apparatus according to claim 23, wherein the first lens has a toroidal shape.

* * * * *